United States Patent [19]

Bordener

[11] Patent Number: 5,885,503
[45] Date of Patent: *Mar. 23, 1999

[54] MOLD PROCESS FOR PRODUCING A FINISHED SOLID SURFACE COUNTERTOP

[75] Inventor: Robert Bordener, Bloomfield Hills, Mich.

[73] Assignee: Talon Surfaces, LLC, Troy, Mich.

[ * ] Notice: The term of this patent shall not extend beyond the expiration date of Pat. No. 5,628,949.

[21] Appl. No.: 921,203

[22] Filed: Aug. 27, 1997

Related U.S. Application Data

[63] Continuation-in-part of Ser. No. 854,337, May 12, 1997, Pat. No. 5,628,949.

[51] Int. Cl.$^6$ ............................ B29C 41/08; B29C 71/02
[52] U.S. Cl. ........................ 264/254; 264/255; 264/308; 264/309; 264/DIG. 53; 264/DIG. 72
[58] Field of Search ................................ 264/73–74, 130, 264/131, 332, 250, 255, 246, 247, 219, 236, 237, 347, 348, DIG. 53, DIG. 72, 161–162, 245

[56] References Cited

U.S. PATENT DOCUMENTS

| | | | |
|---|---|---|---|
| 2,948,651 | 8/1960 | Waag ........................................ | 264/255 |
| 3,079,644 | 3/1963 | Molitor et al. . | |
| 3,193,598 | 7/1965 | Schafer . | |
| 3,219,735 | 11/1965 | Iverson et al. . | |
| 3,325,574 | 6/1967 | Stadden . | |
| 3,350,483 | 10/1967 | Erb et al. . | |
| 3,378,612 | 4/1968 | Dietz . | |
| 3,488,246 | 1/1970 | Duggins . | |
| 3,492,391 | 1/1970 | Van Atten . | |
| 3,773,886 | 11/1973 | Starr et al. . | |
| 3,914,485 | 10/1975 | Curtis . | |
| 3,941,636 | 3/1976 | Drout et al. . | |
| 3,947,178 | 3/1976 | Belshaw et al. . | |
| 4,016,235 | 4/1977 | Ferro . | |
| 4,104,353 | 8/1978 | Monnet . | |
| 4,155,969 | 5/1979 | Hendry . | |
| 4,244,993 | 1/1981 | Platka, III et al. ...................... | 264/138 |
| 4,405,551 | 9/1983 | Barnard et al. ......................... | 264/245 |
| 4,473,516 | 9/1984 | Hunerberg . | |
| 4,481,160 | 11/1984 | Bree . | |
| 4,543,366 | 9/1985 | Smith . | |
| 4,544,584 | 10/1985 | Ross et al. . | |
| 4,554,118 | 11/1985 | Seifert .................................... | 264/255 |
| 4,664,982 | 5/1987 | Genovese et al. . | |
| 4,743,417 | 5/1988 | Bakkelunn . | |
| 5,028,459 | 7/1991 | Lathrop . | |
| 5,047,187 | 9/1991 | Banus . | |
| 5,185,192 | 2/1993 | Banus . | |
| 5,342,565 | 8/1994 | Goren ..................................... | 264/255 |
| 5,678,906 | 10/1997 | Riestra et al. .......................... | 264/255 |

*Primary Examiner*—Angela Ortiz
*Attorney, Agent, or Firm*—Gifford, Krass, Groh, Sprinkle, Anderson & Citkowski, P.C.

[57] ABSTRACT

A cast, composite countertop is prepared by spraying a castable, curable organic resin composition which includes over 20% by weight of an inorganic, particulate material therein, into a mold cavity corresponding to a top surface and side wall of a countertop so as to produce a continuous coating therein. This coating is at least partially cured, and a hardenable, liquid substrate composition introduced into the mold cavity, and the resultant composite is fully cured to produce a countertop. In some instances, an additional casting step may be employed to build up the edge thickness. Also disclosed are dual spray techniques for enhancing the surface quality of the composite, and techniques for enhancing the thermal stability thereof. Also disclosed are countertops made by the disclosed methods.

22 Claims, 3 Drawing Sheets

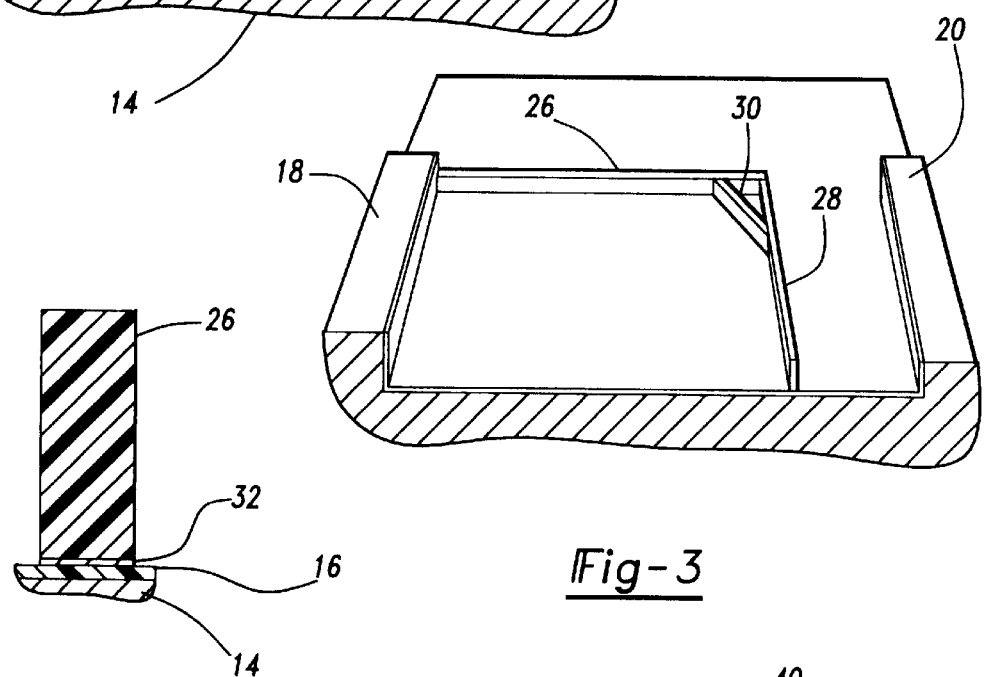
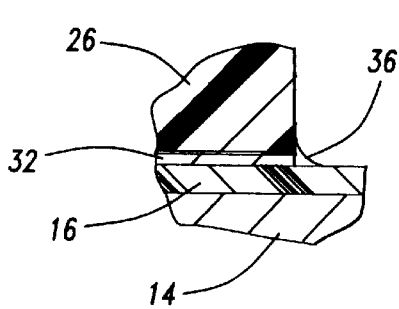
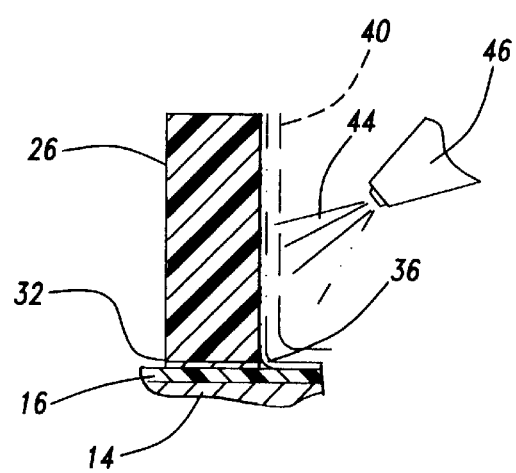

MOLD PROCESS FOR PRODUCING A FINISHED SOLID SURFACE COUNTERTOP

This is a Continuation-in-part of application Ser. No. 08/854,337 filed on May 12, 1997 which is U.S. Pat. No. 5,628,949.

BACKGROUND OF THE INVENTION

1. Field of the Invention

The present invention relates generally to molded countertops for use particularly in kitchens and bathrooms and, more particularly, to a novel molding process for producing a finished solid surface countertop.

2. Description of the Prior Art

Countertops, table tops and the like have long been made from materials such as wood, metal and stone. Wood is the easiest material to fabricate; but, it is easily cut or chipped, not sanitary, and does not resist high temperatures. Metal and stone are very durable, and resistant to temperature extremes; but they are difficult to fabricate. In addition, all such materials are relatively expensive. As a consequence, the industry has turned to the use of synthetic materials for the fabrication of countertops. Such materials are generally based upon organic polymers.

Various processes and procedures are known in the art for producing solid surface, fiber reinforced polymer, and cultured marble countertops. The term solid surface pertains to a material where there is no painted or laminated skin or outer surface, and in such materials, small scratches and burns, etc. can be sanded or buffed out.

The industry for solid surfacing began approximately twenty-five years ago when Dupont Inc. developed a high quality surfacing material known commercially as Corian®. Since the early 1980's, several major manufacturers have developed their own brand of solid surface products. For the most part, these products are expensive to produce and are distributed in nominal sized sheets that are fabricated by the lengthy process of cutting the sheet into the desired countertop shape and re-bonding by adhesive or the like to a substrate surface.

More recently, spray-on solid surface materials, such as those commercially known as Safas® and Omniplex®, have come into use. In one known application, these spray-on materials are coated over an inexpensive substrate, such as a particle board or other material which is already shaped in the desired fashion. Once the spray-on material has dried, a lengthy sanding and finishing process is required to bring the finish up to the desired quality, and there still is a need to remove pinholes exposed during this process, which are a by-product of the fabrication process of coatings of this type. Such sanding and finishing processes are necessary for providing an acceptable finish and have thus far proven too labor intensive to be workable in today's production countertop industry.

Direct molding processes are very attractive for the fabrication of countertops, sinks, basins and such units, since techniques of this type permit fabrication of a finished shape having good surface quality. One molding process involves the so-called cultured marble materials. These include an outer gel coat polymer layer, comprised of a relatively soft, unfilled resin, disposed over a faux-veined, mineral-filled resin base which attempts to provide the appearance of stone. This second layer may be backed with an additional layer of low cost material. Cultured marble articles are not very durable, since the gel coat is readily scratched, chipped or delaminated. Also, scratches or chips cannot be readily sanded out of the gel coat because it is soft and fairly thin. Additionally, moisture or thermal shock can cause cultured marble articles to delaminate, crack or wrinkle, particularly if there are any breaks in the gel coat. As will be detailed hereinbelow, the present invention provides a method whereby a composite countertop or the like may be fabricated by a molding process so as to have a surface comprised of a relatively thick body of organic resin based, high quality, solid surface material, which provides durability and aesthetics, and which is supported upon a durable, relatively low cost body of substrate material. Furthermore, the present invention eliminates the need to grind down or otherwise undertake extensive finishing steps to produce a high quality surface. These and other advantages of the present invention will be apparent from the drawings, discussion and description which follow.

BRIEF DESCRIPTION OF THE DRAWINGS

Reference will now be had to the attached drawings, when read in combination with the following specification, wherein like reference numerals refer to like parts throughout the several views, and in which:

FIG. 2 is a perspective view of the mold surface used in the mold process of the present invention;

FIG. 3 is a view similar to FIG. 2 and showing the placement of the barriers which define a negative of the desired shape formed within the mold;

FIG. 4 is a partial view in cross section of a barrier used in the mold shown in FIG. 3 and the adhesive means for securing it to the mold surface;

FIG. 5 is a view similar to FIG. 4 and showing the creation of a fillet along an edge between a barrier or wall of the mold and the flat mold surface;

FIG. 6 is a view similar to FIG. 4 and showing the application of a release coating and the subsequent spray application of the resin surface coating onto the prepared surfaces of the mold;

BRIEF DESCRIPTION OF THE INVENTION

Figure 1:
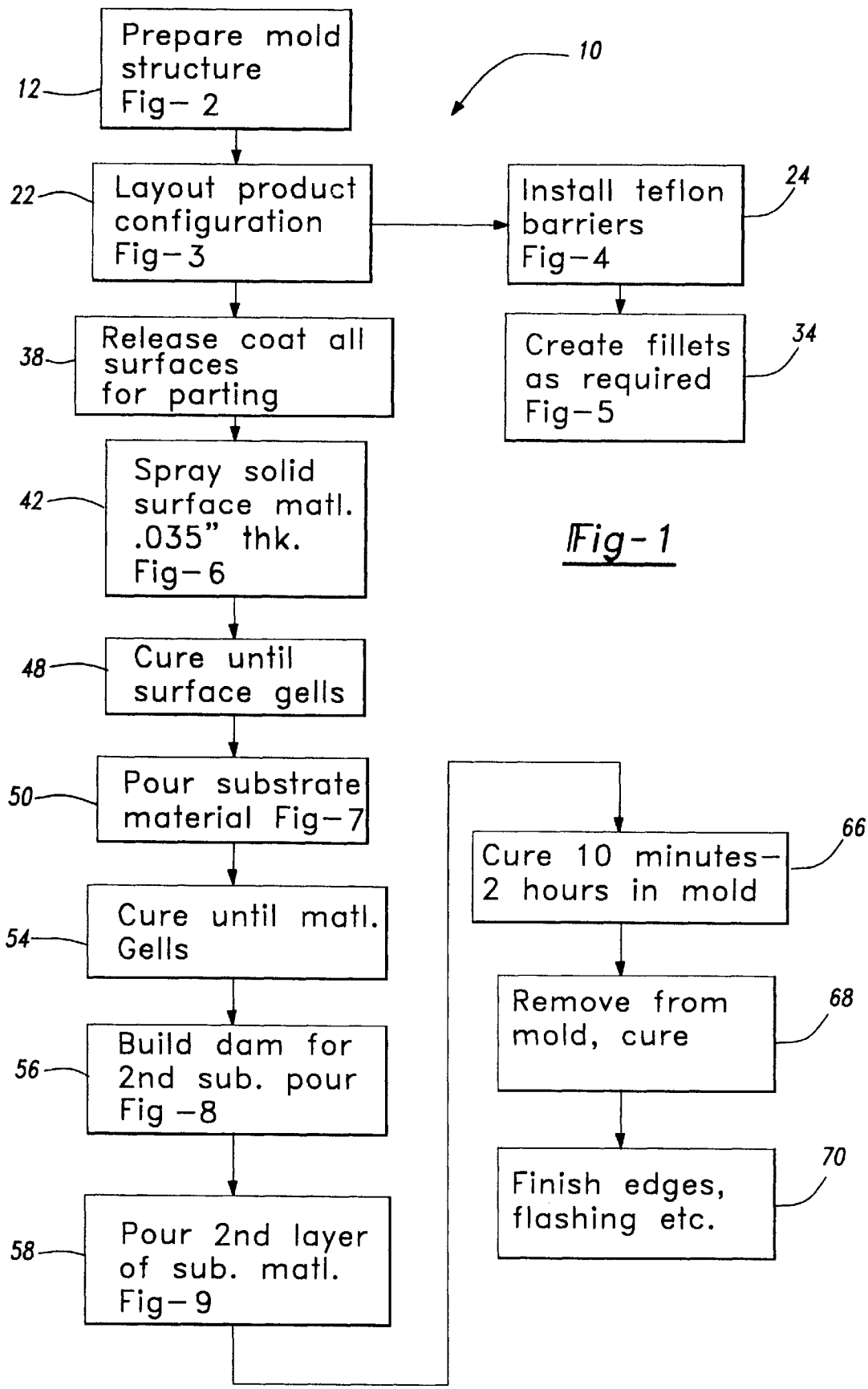
FIG. 1 is a block diagram of the mold process for creating a finished solid surface countertop according to the present invention.

There is disclosed herein a method for producing a cast, composite countertop. The method includes the steps of providing a mold having a cavity which corresponds to a countertop, and includes a bottom surface which corresponds to a top surface of the countertop, and a side wall which corresponds to an edge surface of the countertop. In a further step, the cavity is coated with a castable, curable organic resin composition which includes more than 20% by weight of an inorganic particulate material therein, so as to form a continuous coating which covers the bottom and side wall of the mold cavity. The coating is at least partially cured, and a hardenable, liquid, substrate composition is introduced into the mold cavity atop only a portion of the partially cured coating of castable, curable organic resin composition. The hardenable liquid substrate composition forms a first layer which fills only a portion of the mold cavity and which leaves exposed a portion of the at least partially cured coating covering the side wall. Subsequently, the hardenable liquid is allowed to at least partially harden, and a dam member is disposed on the at least partially hardened first layer, in a spaced apart relationship with the side wall. A second portion of the hardenable liquid substrate is then introduced into the space defined between the dam member and the side wall and allowed to harden. In this manner, there is produced a composite countertop having an outer surface comprised of a cured body of the castable, curable organic resin composition and having a thickness which is greatest proximate an edge thereof.

In particular embodiments, the castable, curable organic resin composition includes a polyester resin, such as an isopthalic or orthopthalic resin therein.

These resin compositions may further include neopentylglycol therein. In some specific embodiments, the composition includes an epoxy resin or an acrylic resin therein.

In some specific embodiments, the castable, curable organic resin composition includes granules therein comprised of a body of solid, organic polymer having at least a portion of the inorganic particulate material disposed therein. These granules preferably comprise, by weight, 20–40% of the castable, curable organic resin composition. The castable, curable organic resin composition may further include an air releasing agent therein. In some embodiments, the hardenable, liquid substrate composition comprises a curable organic resin and a filler.

In other embodiments of the present invention, thermally stable, cast, composite countertops are produced by a method wherein a coating of a castable, curable organic resin composition is applied to a mold cavity which corresponds to the countertop. The coating is at least partially cured, and a hardenable, liquid substrate composition is cast into the cavity, atop the at least partially cured layer. In accord with the present invention, the hardenable, liquid, substrate composition is selected so as to have, when hardened, a coefficient of thermal expansion which generally differs by no more than ±50% from the coefficient of thermal expansion of the cured coating of the castable, curable organic resin. In this manner, there is produced a composite countertop which is stable to repeated thermal cycling.

In another aspect of the present invention, there is provided a method for producing a cast, composite countertop. According to the method, there is provided a mold having a cavity which corresponds to the surface of a countertop, and a castable, curable organic resin composition which is comprised of a first concentration of granules of a particulate material disposed in a curable organic resin. A first coat of the castable, curable organic resin composition is sprayed into the cavity under spray conditions which cause a portion of the organic resin to flash off so as to coat the cavity with a first continuous coating which is enriched in said granules, such that the granules in the first coating are present in a second concentration which is greater than the first concentration of granules. In a subsequent step, a second coat of the castable, curable organic resin composition is sprayed into the cavity atop the first coating so as to provide a second coating thereupon. The first and second coatings are at least partially cured and a hardenable, liquid substrate composition is introduced into the mold cavity atop the at least partially cured second coating. Hardening of the hardenable liquid substrate composition produces a cast, composite countertop having a top surface comprised of a cured body of the castable, curable organic resin composition. In particular embodiments, the flashing off of excess resin from the composition in the first spraying step is accomplished by spraying at a high pressure and/or by a spray process in which the spray nozzle is normally maintained at approximately 18–36 inches from the mold cavity.

DESCRIPTION OF THE PREFERRED EMBODIMENT

The present invention is directed to countertops and the like having a high quality surface layer fabricated from a high hardness material, which is backed by a lower cost body of substrate material. The countertops of the present invention provide performance characteristics achievable heretofore only with bulk fabricated solid surface materials; but, they are readily fabricated by an in-mold veneer process which conserves labor and materials and which produces a high quality finished surface.

Within the context of the present invention, high quality resin material is defined as a composition of an organic resin having more than 20%, by weight, of an inorganic filler material disposed therein. The filler material provides hardness and durability to the finished product and may comprise materials such as alumina trihydrate, calcium carbonate, glass, silaceous materials and the like, taken either singly or in combination. The inorganic filler material may be uniformly dispersed throughout the resin, or in some preferred embodiments, a portion of the inorganic filler material is disposed in granules comprising a solid organic polymer having a very high loading of inorganic filler therein. In such instance, the granules are first fabricated from the highly loaded polymer, and once hardened, are ground to a particle size, generally in the range of 0.1–5.0 mm. These granules are then loaded into a curable, liquid resin, which may further include dispersed inorganic filler particles therein. By incorporating the filler in preformed granules of appropriate size, higher filler loadings may be achieved without adversely affecting the spray quality of the resultant resin combination. For example, if very high loadings of finely ground inorganic filler material were simply dispersed in a resin, that resin may be too viscous to be readily applied by a spray coating process; however, if the same amount of filler were at least partially segregated into granules, preferably larger than US 80 mesh, flow characteristics would be maintained. Furthermore, granules may be colored so as to contrast with the base resin thereby providing an effect reminiscent of granite or other natural stone. In some instances, granules will be purposely chosen so as to not contrast with a base resin so as to produce a coating having a uniform appearance. As will further be described hereinbelow, by the use of appropriate spraying techniques, the granules may be concentrated at the surface of a countertop to greatly enhance the hardness and aesthetic appeal thereof.

Within the context of this disclosure, countertops shall refer to all sheet-like bodies of material which may be prepared in accord with the present invention and specifically includes, but is not limited to, sills, thresholds, table tops, mantles, wall panels, building panels and the like. It is also to be understood that countertops may include nonplanar segments such as basins and the like defined therein. Within the present disclosure, all of the foregoing are collectively referred to as countertops. As will be explained hereinbelow, there are a number of techniques and materials which may be used to implement the present invention.

Referring to the block diagram of FIG. 1 and FIGS. 2–9, a unique and novel mold process 10 for constructing a finished solid surface countertop is shown. Primarily, such countertops are produced for use in kitchens and bathrooms and their process of manufacturing is as follows.

At step 12, the mold structure is prepared for the process 10 of the present invention. Referring again to FIG. 2, the mold includes a body 14 having a cavity defined therein which corresponds to the countertop. The mold has a flat, polished bottom surface 16 which corresponds to the top surface of the countertop, and a side wall, for example side wall 18, which corresponds to an edge of the countertop. The surfaces of the mold cavity are preferably fabricated from a nonporous material which is capable of taking a high polish, such as stainless steel, or polymers such as Formica®.

At step 22, the configuration of the desired countertop product is assembled upon the mold. At step 24, the preparation of the mold enclosure includes the assembly of barriers onto the mold surface. Referring to FIG. 3, a series of barriers 26, 28 and 30 are constructed upon the surface of the mold and form a cavity corresponding to the negative impression of the desired countertop surface to be produced. The barriers 26 and 28 form two sides of a generally rectangular shaped mold configuration and the barrier 30 forms an angle between the two sides. The sides and edges of the mold are also utilized in creating the desired mold enclosure as shown in FIG. 3. The barriers are preferably constructed of a polymeric material such as polypropylene or a fluoropolymer material to provide a non-stick surface to the mold materials which are subsequently applied, however; the barriers can be constructed of any other material such as wood, metal and the like which fulfills the required function. Also, a dedicated mold having fixed side walls may be similarly employed. It is also to be noted that while the process is described with reference to the fabrication of a rectangular countertop, other shapes such as circles, ovals, polygons and the like can be made by the present invention.

Referring to FIG. 4, a given barrier such as barrier 26 is shown in side view mounted atop the bottom surface of the mold. A durable adhesive such as a two-way tape layer 32 is provided for releasably securing the barrier 26 upon the mold surface. Alternatively, the barrier 26 may be mechanically affixed, as for example by clamps, screws, sockets or the like. At step 34, and referring to FIG. 5, a plurality of fillets 36 are created around the edges between the mold surface 16 and the barriers, such as barrier 26. The fillets are preferably constructed of a moldable clay and are applied in a 0.25" (inches) round diameter roll form extending along the edges of the mold or barriers. The clay fillets are fitted into the exposed edges by an appropriately shaped tool having a spherical shaped head portion on the end of a metal rod. (not shown). The purpose of the fillets is to provide a rounded top edge to the desired upper surfaces of the countertop to be formed in the mold.

At step 38, and referring to FIG. 6, a release material such as a wax coating 40 is applied over all of the surfaces of the mold. The release coating is of a conventional type known in the art such as a silicone or wax, and is capable of being applied by a rag or other type of applicator onto the exposed mold surface. The purpose of the coating is to provide a buffer between the surface of the mold and the resinous material of the countertop. In the absence of the release coating the resinous material would tend to bond to the surface of the mold and would inhibit the removal of the finished countertop from the mold. It is to be noted that a single application of the release coating may suffice for several uses.

At step 42 and referring again to FIG. 6, a high quality resin surface coating 44 is applied through a spray applicator 46 onto the waxed surfaces of the mold. The resin coating 44 is preferably a high grade polyester or acrylic resinous material such as previously described, and such materials are commercially known as Safas® or Omniplex®. Preferably, a quantity of inorganic filler material and/or polymeric chips loaded with inorganic filler is mixed into the spray resin in order to enhance the hardness and durability of the resin and to provide attractive design and color characteristics to the coating. The resin coating 44 is preferably applied to a thickness of 0.035" (inches), however this range can easily vary plus or minus 0.010" (inches) as desired. It is to be understood that thicker or thinner layers may be employed within the context of this invention. As illustrated, the resin is preferably applied by spraying; although, other coating techniques may be employed. For example, the resin may be slush coated, or it may be extruded onto the mold surface by the use of curtain wall techniques or the like.

Figure 7:
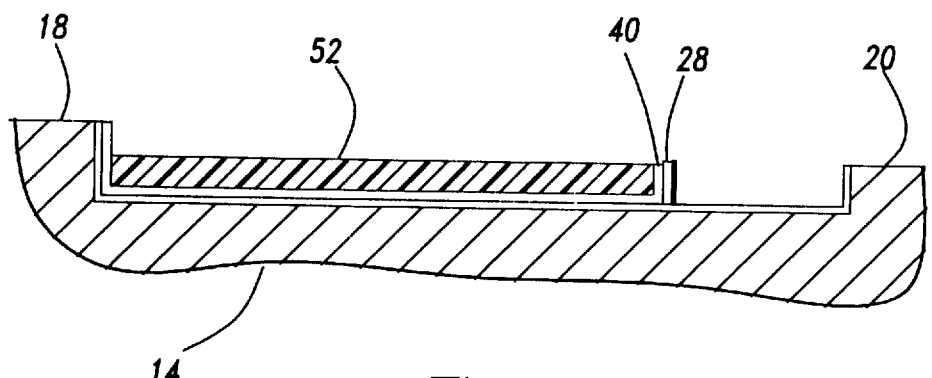
FIG. 7 is a side view of the mold of FIG. 3 and showing the application of a first layer of substrate material poured over the sprayed resin coating.

At step 48 the resinous coating 44 is left to set to a point at which the coating begins to gel. At this point, a substrate material is poured into the mold and over the resinous coating 44 (see step 50). Referring to FIG. 7, a low grade plasticized substrate material 52 is poured into the mold over the gelled high quality resin coating 44. The plasticized substrate material is preferably a low grade resin of a given mixture and is applied to a thickness of around 0.75" (inches).

A preferred recipe for the substrate material is made up of a 75% calcium carbonate (or Gypsum) content and a 25% ortho-resin or other low grade oil based resin material. A measured portion of polyester micro balloons is added to the mixture to lighten the mixture color and to provide insulating characteristics to the mixture. Also, short lengths of a high-tensile glass fiber can be added for strength or an unpromoted ortho-based resin can be added to provide flexibility and to retard cure time. Finally, a liquid catalyst such as a methyl ethyl ketone peroxide is added to initiate the hardening and curing of the substrate material prior to its pouring into the mold.

A side effect of the catalyst is the elevating of the substrate material temperature to a range of approximately 120 degrees Fahrenheit to 180 degrees Fahrenheit. The heating of the mixture upon adding the catalyst also assists in the hardening and curing of the gelled resin coating 44 and the bonding of the coating 44 with the substrate layer 52.

In many instances, the foregoing steps will produce a finished countertop acceptable for many applications. However, in instances where a relatively thick member is being fabricated, it may be desirable to include a built up edge therein. As will be explained hereinbelow, a built up edge refers to the fact that the composite countertop of the present invention has a greater thickness proximate at least one edge thereof than it does at central portions thereof. A built up edge enhances the aesthetic appeal of the countertop, while minimizing weight and materials employed in its fabrication. A built up edge may be manufactured in a single step molding process, wherein an insert member is disposed so as to partially fill the mold cavity in those regions which correspond to areas of the finished countertop having a reduced thickness. For example, an insert member may be suspended in the mold so as to fill central portions thereof, while leaving edge portions unfilled. In this manner, when the substrate material is cast into the mold, it will form a thinner layer in the areas of the insert, but a full thickness layer proximate the edges. After curing of the substrate material, the insert member is removed, and a built up edge is obtained. A built up edge may also be obtained by what is referred to herein as a two pour process as described hereinbelow.

Figure 8:
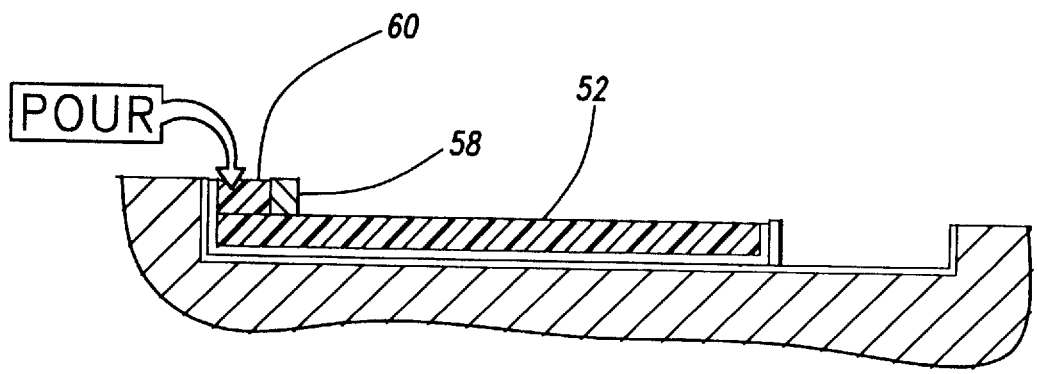
FIG. 8 is a view similar to FIG. 7 and showing the construction of a dam upon a gelled surface of the first layer of substrate material for the application of a second layer of substrate material.

At step 54, and referring to FIG. 8, the substrate material 52 begins to gel after a measured period of curing. At step 56, a dam is constructed prior to subsequent pouring of substrate material. Specifically, a rectangular shaped backing member fabricated from a polymer or like material 58 is secured to the hardened surface of the substrate layer 52 by adhesives or other conventional fastening means as is known in the art. The installation of the backing 58 creates a space between the backing and the sides of the mold which were previously covered by the layer 41 of solid surface material. A second substrate layer 60 is poured into the dammed area, preferably again in a thickness range of approximately 0.75" (inches).

Figure 9:
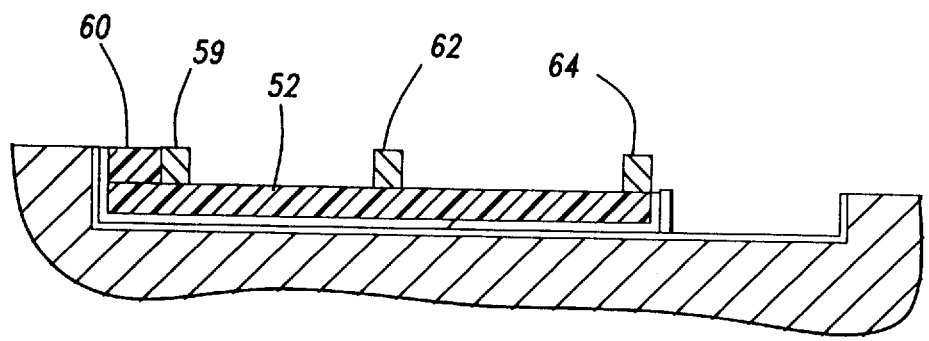
FIG. 9 is a view similar to FIG. 8 and showing a finished countertop in the mold with substrate backing portions in place.

Referring to FIG. 9, the backing member 58 is removed and replaced with a wood backing 59, applied by a bonding adhesive. Additional wood backings 62 and 64 may also be attached to the cured surface of the substrate material 52 and permit the finished countertop to be attached atop a cabinet (not shown).

The finished countertop can have any desired thickness, but is preferably approximately 0.25 to 0.75 inches thick at its narrowest point and is approximately 1–2 inches nominal thickness around its front edge; however, some commercial applications may require front edges of approximately 4 inches. Additional layers of substrate material can be added to produce a countertop having any desired thickness. At step 66, the countertop is allowed to cure in the mold, typically for a period of between 10 minutes and 2 hours and at step 68 is removed from the mold and allowed to cure for an additional time. At step 70, once the countertop has mostly to completely dried and cured, flashing which forms during the molding process is removed and the edges are finished by sanding.

After the composite countertop has been at least partially hardened, it may be desirable to subject the article to a further, high temperature cure, typically by baking the item in an oven at a temperature of approximately 110° F. to 200° F. for 5 to 16 hours. Such elevated temperature curing further enhances the hardness of the resultant article. High temperature curing is typically carried out on a countertop after it has been removed from its mold, but may also be carried out on an article which is still in a mold. The present invention has identified thermal compatibility as a significant factor to be considered in the fabrication of such composite articles. Specifically, it has been found that stresses and strains which can adversely affect the appearance, integrity and service life of the countertops of the present invention can arise if the thermal coefficient of expansion of the cured resin composition of the surface layer and the hardened material of the substrate body differ by more than 50% over a temperature range encountered during the fabrication, curing and use of the composite countertops. Accordingly, it is another feature of the present invention that the top layer of the composite article and the substrate body are fabricated from materials having thermal coefficients of expansion which are relatively similar, and which preferably do not differ by more than 50%.

While the foregoing has described a generalized process for the fabrication of countertops in accord with the present invention, other modifications and variations thereof may be implemented. In one embodiment of the present invention, which is particularly preferred in those instances where the outer surface layer of the composite includes the aforedescribed granules, the outer layer is typically applied in two separate coats. In this embodiment, the first coat is a relatively thin coat referred to as a tack coat, and it is applied under conditions which favor loss of resin therefrom. This is counterintuitive with regard to standard spray coating practices wherein such "flash off" is generally to be avoided. However, it has been found that such flash off actually enhances the quality of the product thus produced. Flashing off of the resin effectively increases the concentration of granules in the tack coat, and produces a high concentration of tightly packed granules at the front surface of the finished composite.

Flash off is enhanced by spraying at relatively high operating pressures. In addition to enhancing flash off, the high pressure causes the granules to impinge strongly onto the mold surface and to be concentrated and tightly packed at what will be the front surface of the finished composite. Flash off may alternatively be enhanced by increasing the distance from the spray nozzle to the mold. Typically, spray compositions of this type are applied from a nozzle which is maintained at approximately 12–18 inches from the surface being coated; but, it has been found that superior results are obtained when the spray nozzle is positioned at a distance of more than 18, and up to 36 inches from the surface. This increased distance enhances flash off, and results in a more uniform distribution and a higher density of granules in the product. Since a large portion of the spray will flash off, the first coat may include a relatively low cost material such as styrene monomer therein as a substitute for some part of the typically employed resin. Thus, the first coat basically provides a delivery vehicle for the granules.

After the first tack coat is applied, a second coat of the resin/granule composition is applied directly thereover. This second coat may be applied under high pressure and/or increased distance conditions, or it may also be advantageously applied utilizing standard spray conditions. In either instance, it has been found that impingement of the second coat onto the first actually enhances the characteristics of the first coat and the resultant product. This is believed to be a result of densification of the first coat resultant from impact of the second coat onto the granules of the first coat, and possibly also from a releasing of air bubbles from the first coat caused by impingement of granules and resin of the second coat. In any event, use of such built up multiple coats produces a very high quality surface, which is subsequently backed with a substrate body as in previous embodiments. The second coat may be applied immediately after the first coat, by changing the spray pressure and/or distance; alternatively, it may be applied in a separate step, displaced in time from the application of the first coat. While two coats are generally sufficient for building up a front surface of the composite article, in some instances, particularly when the front surface layer is to be relatively thick, the use of 3 or more separate applications will be beneficial.

There are a number of resin compositions which may be employed in the practice of the present invention. The outer surface coat of the composite countertop is preferably fabricated from a resin composition based upon castable, curable organic materials such as polyester resins. Among some of the most preferred resins are ispthalic or orthopthalic resins, which most preferably further include neopentylglycol therein. These resins may be further enhanced by the inclusion of epoxies or acrylics therein, and it has been found that inclusion of a relatively small amount of methyl methacrylate greatly enhances the weather resistance of the resultant resin.

The inorganic particulate material may be selected from a wide variety of filler materials depending upon the hardness and aesthetic considerations. In most instances, the filler material will comprise alumina trihydrate, calcium carbonate, glass, silica or other silaceous minerals, either singly or in combination. Typical particle sizes of the fillers are in the range of 0.01–1.0 mm, with 0.07 to 0.3 mm being one particularly preferred range. Loadings of the inorganic particulate are preferably in excess of 20% by weight. The upper limit for fillers will depend upon viscosity and spray characteristics of the resultant mix, and in most instances, an upper limit of approximately 40% by weight will be employed; however, when the inorganic filler is disposed in granules, higher total loadings of filler may be achieved. As previously noted, at least some portion of the inorganic filler may be incorporated into separate, preformed granules, and these granules are typically prepared from resins of the type employed in the fabrication of the layer itself, but are very heavily loaded with particulates. Also, the granules may include small amounts of relatively lightweight material such as glass microspheres which provide hardness and also decrease the specific gravity of the resultant particles so that they may more readily remain in suspension in the remainder of the liquid resin. Granules are generally in the size range of 0.1–5.0 mm; but, for particular applications, other size granules may be employed.

The substrate layer is most preferably fabricated from a highly filled, curable, castable organic resin. This substrate or backing layer provides mechanical integrity and support to the surface layer, and the surface layer, in turn, provides protection and hardness to the underlying substrate layer. As a consequence, the substrate layer may be relatively soft and porous, and is typically made from a low cost material. Since most of the color of the composition will come from the surface layer, coloration of the substrate layer is generally not critical; although in some instances where a relatively translucent first layer is employed, the substrate layer may be appropriately tinted. Most preferably, the substrate layer is fabricated from a similar resin to that of the surface layer, except that it generally includes at least 50% and often significantly more of a filler material therein. Calcium carbonate is one particularly preferred filler for the substrate layer, since it is relatively inert and low in cost. Reinforcing materials such as glass fiber, metal mesh and the like may also be incorporated into the substrate layer. Structural foams may also be incorporated into the substrate layer.

In view of the disclosure presented hereinabove, it will be apparent to one of skill in the art that a number of compositions may be prepared in accord with the principles of the present invention. In order to better explain the present invention, some specific embodiments will be presented, and it is to be understood that these examples are illustrative of the invention, but are not meant to be limitations upon the practice thereof.

EXAMPLE 1

In this example, a castable, curable organic resin composition was prepared which included an inorganic filler disposed in granules as previously described. The granules were first prepared from a castable resin loaded with glass frit particles. The granulate mixture was prepared from 250 grams of isopthalic NPG (neopentylglycol) resin obtained from the Silmar corporation of Fort Wright, Kentucky under the designation #1122A. Approximately 316 grams of glass frit particles obtained from the Ferro corporation of Cleveland, Ohio under the designation FE1000, and having an average particle size of approximately 100 U.S. mesh, were mixed into the resin. 2.5 grams of methyl ethyl ketone peroxide curing catalyst sold by Elf Atochem under the designation Lupersol DDM-9, and 1 gram of a gamma methacryloxy propyl trimethoxy silane coupling agent sold by OSI Specialities of Danbury, Connecticut under the designation Silquest A-174 were also mixed into the resin. The resultant granulate precursor mixture was poured into a stainless steel mold and allowed to cure so as to produce a sheet approximately 6.4 mm thick. This sheet was fragmented into granules having an approximate particle size of 0.5 mm. After fragmentation, the granules were gently heated to effect a second cure. This assures that the exposed resin surfaces are fully hardened so that a dry, free flowing stable granule is obtained.

A casting resin formulation was prepared and this comprised the aforedescribed Silmar 1122 A resin, DDM-9 catalyst and A-174 coupler. Approximately 30% by weight of the previously prepared granules were added to 70% by weight of the resin and filler combination, and the resultant mixture sprayed into a mold in accord with the aforedescribed procedure to produce a coating thereupon of approximately 0.8 mm thickness. This coating was allowed to gel, and a substrate composition was prepared comprising 300 grams of calcium carbonate filler obtained from the Georgia Marble corporation under the designation Mar-Blend and 200 grams of an orthopthalate resin casting composition obtained from the McWhorter Corporation under the designation #70-4012 "blue marble". The backer composition was poured into the mold to produce a layer of approximately 1.25 cm thickness, and the entire composite body allowed to cure for approximately 4 hours, after which it was removed from the mold. This produced a finished article having a very hard, stone-like surface.

EXAMPLE 2

In this example, a top coat formulation of castable, curable organic resin composition was prepared which included a first portion of an inorganic filler disposed in the resin itself, and a second portion disposed in granules of the type previously described. The resin composition was comprised of 20 pounds of isopthalic NPG resin obtained from the Silmar Corporation of Fort Wright, Kentucky under the designation #1122A. The composition further included 635 grams of virgin styrene monomer, 20 grams of an air release composition sold under the designation BYK#A555 by Byk Chemie USA, and comprising a naphtha solution of silicone free anti-foam polymers. The composition also included 140 grams of a fumed silica thixotrope sold under the designation Cab-O-Sill. It has been found generally in the compositions of the present invention that the material preferably be sufficiently thixotropic to permit ready film formation in a mold. A thixotrope index in the range of 4.4 to 5.5 is particularly preferred. The composition also included 5 pounds of alumina trihydrate filler of the type sold by the R. J. Marshall corporation under the designation DF121. This composition was pigmented and included 200 grams of pigment mix sold by H. K. Research Inc. under the designation liquid pigment. It should be further noted that in variations of this formulation, some part of the styrene monomer can be replaced by vinyl toluene monomer (also known as methyl styrene).

The formulation further included granules of the type previously described. The granules were prepared in accord with the procedure of Example 1 and comprise the aforementioned isopthalic NPG resin sold by the Silmar corporation under the designation 1122A, mixed with the aforementioned ATH filler in approximately equal amounts. The granules were prepared as per the procedure of Example 1, and ground so as to produce a particle distribution wherein 10% of the granules had a particle size in the range of 0.1–0.15 mm; 50% of the granules had a particle size in the range of 0.15–0.25 mm; 20% of the granules had a particle size in the range of 0.25–0.50 mm; 10% of the granules had a particle size in the range of 0.50–0.75 mm; and 10% of the granules had a particle size in the range of 0.75–1.2 mm.

In the preparation of the top coat formulation, approximately two-thirds of the resin is added to a shear mixer. After that, the additives and filler are introduced, and the composition mixed to form a thick paste. The remaining resin is then added under shear mixing, and after mixing is complete approximately 8 pounds of the granules are then stirred in. This produces a top coat formulation which may be sprayed into a mold in accord with the aforedescribed procedures. After the top coat mixture has at least partially hardened (typically 10 minutes to 2 hours) a backing composition is cast thereupon to form a substrate as previously described. It is to be understood that a variety of backing compositions may be utilized in combination with this top coat formulation. Such backing compositions have been described hereinabove, and further backing compositions will be presented hereinbelow.

EXAMPLE 3

In this example, another top coat formulation is prepared. The composition is comprised of 22 pounds of a commercially available castable resin sold under the designation H. K. Research, Abrasion-Resistant Gel Coat; and the composition further includes 20 grams of the aforedescribed BYK#A555 air release agent, 5 pounds of the ATH filler DF121 and 200 grams of the aforedescribed H. K. Research liquid pigment. As in the previous example, approximately two-thirds of the resin is blended in a shear mixing apparatus with the remaining ingredients to produce a thick paste, after which the remainder of the resin is added. Once all of the foregoing components are stirred together, approximately 8 pounds of the aforedescribed granules are added. This produces a top coat formulation which may be employed similarly to those previously described.

EXAMPLE 4

In this example, yet another top coat formulation is prepared. The composition includes 22 pounds of the aforedescribed H. K. Research Abrasion Resistant Gel Coat resin, 20 grams of the BYK#A555 air release agent, 5 pounds of quartz particles having a size range between 0.1 mm and 0.3 mm, as supplied by the U.S. Silica corporation; 40 grams of a coupling agent comprising gamma methacryloxy propyl trimethoxy silane, as supplied by OSI Specialities, Danbury, Connecticut under the designation A-174. The composition further includes 150 grams of methyl ethyl ketone peroxide catalyst sold under the designation Lupersol DDM-9 by the Elf-Atochem corporation. This mixture was blended as in the previous examples, and after that 8 pounds of granules, of the type previously described were added. It should be noted that in the previous examples, the granules were saturated with ATH filler; however, in this specific example, the granules are saturated with the aforedescribed quartz particles.

EXAMPLE 5

In this example, another top coat formulation was prepared from 20 pounds of an isopthalic NPG resin of the type sold by the Silmar corporation under the designation 1302A. The composition further included 2.2 pounds of virgin styrene monomer, 1 ounce of the BYK#A555 air release agent; 0.6 pounds of fumed silica thixotropic agent sold under the designation Cab-O-Sill; 5 pounds of glass frit having a particle size in the range of 0.07–0.3 mm as supplied by the Ferro corporation; 0.1 pound of the aforedescribed silane coupling agent sold by OSI Specialities under the designation A-174; and 0.3 pounds of the MEK-peroxide catalyst sold under the designation Lupersol DVM-9. This composition did not include any granules, and was blended as in accord with previous procedures.

EXAMPLE 6

This example is directed to a backing composition, and it is to be understood that this backing composition, as well as others described herein, can be used with various of the top coat compositions described herein. This composition is comprised of 20 pounds of a PG-ortopthalic resin of the type sold by the McWhorter corporation under stock number 7014. The composition further includes 0.3 pounds of an unpromoted flexibilizing resin sold by the McWhorter corporation under the designation Flex 8000, and 0.3 pounds of chopped glass fibers having a strand length of approximate one-quarter inch. The composition also includes 63 pounds of calcium carbonate filler obtained from the Georgia Marble corporation under the designation Mar-Blend, and 65 cc of an MEK-peroxide hardener sold under the designation Norox, and having 9% active oxygen.

The resins are blended with the fibers for approximate 3–5 minutes, then the filler is gradually added, and mixing continued for 3 to 5 minutes, after which the catalyst is added, and mixing continued for an additional 3 to 5 minutes. The mixture gels at 75° F. in approximately 18 minutes, and hardens fully in 24 hours.

EXAMPLE 7

This example is also directed to a backing composition. This composition is comprised of 20 pounds of a commercially available casting resin sold by the Reichold corporation under the designation 32138-00. The resin was filled with 110 pounds of the Mar-Blend calcium carbonate filler, and activated with 65 cc of an MAE-peroxide hardener sold under the designation Superox 46-709. The mixture was stirred in a shear blender, as previously described. It has been found that for higher filler loadings, as in this example, the resin is preferably heated to a temperature of approximately 130° F. during mixing, and by doing so, in-mold shrinkage is controlled appropriately.

EXAMPLE 8

This example is directed to another backing composition fabricated from a dicyclopentadiene (DCPD) resin. Such resins are relatively low in cost and provide for rigid compositions. This mixture was prepared from 20 pounds of a DCPD resin sold by Reichold Chemical Corporation under the stock number 32141;3 pounds of one-eighth inch milled glass fibers treated with silane coupling agent, and supplied by Resource Recycling Services Inc., Oceola, Indiana; 95 pounds of calcium carbonate filler, of the type sold under the designation Mar-Blend and 70 cc of an MEK-peroxide hardener sold by the Reichold Chemical Corporation under the designation Superox 46-709. This casting composition was mixed as in the previous example, at a temperature of approximately 130° F.

All of the foregoing top coat and backing compositions may be employed in various combinations, within the scope of the present invention. As will be appreciated by those of skill in the art, other fillers, coloring agents, reinforcing agents, and the like may be added to the various compositions, and all of such variations are within the scope of the present invention.

The foregoing are illustrative of particular embodiments of the present invention and are not meant to be limitations upon the practice thereof. Yet other embodiments may be implemented. For example, while the aforedescribed drawings depict a mold in which the side walls are generally planar, and at approximate right angles to the bottom, curved or sloped side walls may be similarly employed. For example, side walls may be utilized having a semicircular profile so as to produce a countertop having a bull nosed edge. Such curved edges may be employed in combination with the two pour methodology described above to produce a built up edge, or they may be employed with a single pour method.

The present invention therefore provides a unique and novel process for creating a molded countertop article having a high quality surface finish and which does not require any sanding of the spray coat finish in order to remove pinholes and other imperfections which result from known conventional methods for producing such countertops. The formation of the solid surface countertop within the mold prevents the formation of pinholes in the coating surface which would otherwise have to be sanded or buffed out. Furthermore, the countertops of the present invention have a high quality, durable surface not attainable with cultured marble technology.

Having described my invention, additional embodiments will become apparent to those skilled in the art to which it pertains without deviating from the scope of the appended claims.

I claim:

1. A method for producing a cast, composite countertop, said method including the steps of:
   providing a mold having a mold cavity defined therein, said mold cavity corresponding to a countertop, and including a bottom surface which corresponds to a top surface of the countertop, and a side wall which corresponds to an edge surface of the countertop;
   providing a castable, curable, organic resin composition which includes an inorganic, particulate material therein;
   coating said cavity with said castable, curable organic resin composition so as to form a continuous coating therein which covers the bottom surface and side wall of said mold cavity;
   at least partially curing said continuous coating of castable, curable organic resin composition so as to provide an at least partially cured coating thereof;
   providing a hardenable, liquid, substrate composition;
   disposing a first portion of said hardenable, liquid, substrate composition in said mold cavity, atop only a portion of said at least partially cured coating so as to form a first layer of said hardenable liquid substrate composition therein which fills only a portion of said mold cavity and which leaves exposed a portion of said at least partially cured coating which covers said side wall;
   at least partially hardening said first layer of hardenable, liquid, substrate composition;
   disposing a dam member on said at least partially hardened first layer of hardenable liquid substrate composition, in a spaced apart relationship with the side wall of the mold cavity so as to define a space therebetween which has exposed therein said portion of said at least partially cured coating which said first layer leaves exposed; and
   disposing a second portion of said hardenable, liquid, substrate composition in the space defined between said dam member and said side wall; whereby there is provided a composite countertop having a thickness which is the greatest proximate an edge thereof.

2. A method as in claim 1, wherein said step of providing a castable, curable organic resin composition comprises providing a composition including 30–90% by weight of said inorganic particulate material.

3. A method as in claim 1, wherein said step of providing a castable, curable organic resin composition comprises providing a composition including inorganic particulate material therein having a particle size in the range of 0.01–1.0 mm.

4. A method as in claim 1, wherein said step of providing a castable, curable organic resin composition comprises providing a composition including a polyester resin therein.

5. A method as in claim 4, wherein said polyester resin comprises an isopthalic or orthopthalic resin.

6. A method as in claim 5, wherein said composition further includes neopentylglycol therein.

7. A method as in claim 4, wherein said castable, curable organic resin composition includes an epoxy resin or an acrylic resin therein.

8. A method as in claim 1, wherein the step of providing a castable, curable organic resin composition comprises providing a composition which includes granules therein, said granules comprising a body of solid, organic polymer having at least a portion of said inorganic particulate material disposed therein.

9. A method as in claim 8, wherein said granules have a particle size in the range of 0.1–5 mm.

10. A method as in claim 8, wherein said granules comprise, by weight, 20–40% of said castable, curable organic resin composition.

11. A method as in claim 1, wherein the step of coating said mold cavity comprises coating said mold cavity so as to form a continuous coating therein having a thickness in the range of 0.015 to 0.06 inch.

12. A method as in claim 1, wherein said step of providing a castable, curable organic resin composition comprises providing a composition including an inorganic particulate material therein selected from the group consisting of: alumina trihydrate, glass, silaceous minerals, calcium carbonate, and combinations thereof.

13. A method as in claim 1, wherein said step of providing of a castable, curable organic resin composition comprises providing a composition including an air releasing agent therein.

14. A method as in claim 1, wherein the step of coating said mold cavity comprises spraying said mold cavity with said castable, curable organic resin composition.

15. A method as in claim 1, wherein the step of providing a hardenable, liquid, substrate composition comprises providing a composition including a curable organic resin and a filler.

16. A cast, composite countertop made by the process of claim 1.

17. A method for producing a thermally stable cast, composite countertop, said method including the steps of:
   providing a mold having a mold cavity defined therein, said mold cavity corresponding to a countertop, and including a bottom surface which corresponds to a top surface of the countertop, and a side wall which corresponds to an edge surface of the countertop;

providing a castable, curable, organic resin composition;

coating said cavity with said castable, curable organic resin composition so as to form a continuous coating therein which covers the bottom and side wall of said mold cavity;

at least partially curing said continuous coating of castable, curable organic resin composition so as to provide an at least partially cured coating thereof;

providing a hardenable, liquid, substrate composition which, when hardened, has a coefficient of thermal expansion which differs from a coefficient of thermal expansion of said castable, curable, organic resin composition, when cured, by no more than ±50%;

disposing said hardenable, liquid, substrate composition in said mold cavity, atop said at least partially cured coating; and hardening said hardenable, liquid, substrate composition; whereby there is produced a thermally stable, composite countertop having a top surface comprised of a cured body of said castable, curable organic resin composition.

18. A thermally stable, cast, composite countertop made according to the process of claim 17.

19. A method for producing a cast, composite countertop, said method including the steps of:

providing a mold having a cavity defined therein, said cavity corresponding to a countertop, and including a bottom surface which corresponds to a top surface of the countertop, and a side wall which corresponds to an edge surface of the countertop;

providing a castable, curable, organic resin composition which includes a first concentration of granules of a particulate material in a curable organic resin;

spraying a first coat of said castable, curable organic resin composition into said cavity so as to flash off a portion of said curable organic resin and coat said cavity with a first continuous coating comprised of a second concentration of said granules in said curable resin, said second concentration being greater than said first concentration;

spraying a second coat of said castable, curable organic resin composition into said cavity, atop said first continuous coating, so as to provide a second coating thereupon;

at least partially curing said first continuous coating and said second coating;

providing a hardenable, liquid, substrate composition;

disposing said hardenable, liquid, substrate composition in said mold cavity, atop said second coating after said second coating has been at least partially cured; and hardening said hardenable, liquid, substrate composition; whereby there is produced a composite countertop having a top surface comprised of a cured body of said castable, curable organic resin composition.

20. A method as in claim 19, wherein the step of spraying said first coat is carried out at a spray pressure greater than a spray pressure at which said step of spraying said second coat is carried out.

21. A method as in claim 19, wherein the step of spraying said first coat comprises spraying said castable, curable organic resin composition into said cavity from a spray nozzle which is spaced from said cavity by a distance in the range of 18 to 36 inches.

22. A cast, composite countertop made according to the process of claim 19.

* * * * *

UNITED STATES PATENT AND TRADEMARK OFFICE
CERTIFICATE OF CORRECTION

PATENT NO. : 5,885,503
DATED : March 23, 1999
INVENTOR(S) : Robert Bordener

It is certified that error appears in the above-identified patent and that said Letters Patent is hereby corrected as shown below:

Column 5, line 30 - After the word "applied" delete [,] and insert -- ; --.
Column 5, line 31 - After the word "however" delete [;] and insert -- , --.
Column 7, line 13 - Delete [41] and insert -- 44 --.

Signed and Sealed this

Twenty-fourth Day of August, 1999

Attest:

Q. TODD DICKINSON

Attesting Officer

Acting Commissioner of Patents and Trademarks